United States Patent [19]

Mueller et al.

[11] Patent Number: 5,429,376

[45] Date of Patent: Jul. 4, 1995

[54] FLUID-OPERATED COLLET CHUCK WITH CENTERING FINGERS

[75] Inventors: Gerald E. Mueller, Frankenmuth; Gene B. Slachta, Saginaw, both of Mich.

[73] Assignee: General Manufacturing Systems, Inc., Saginaw, Mich.

[21] Appl. No.: 203,426

[22] Filed: Mar. 1, 1994

[51] Int. Cl.6 ............................................. B23B 31/20
[52] U.S. Cl. ................................... 279/4.07; 279/4.03; 279/132; 279/133
[58] Field of Search .............. 279/2.02, 2.03, 2.07, 279/2.08, 4.03, 4.07, 4.09, 132, 133, 137

[56] References Cited

U.S. PATENT DOCUMENTS

| | | |
|---|---|---|
| 2,460,577 | 2/1949 | Hohwart et al. . |
| 2,509,673 | 5/1950 | Church . |
| 2,565,430 | 8/1951 | Hohwart et al. . |
| 2,873,121 | 2/1959 | Hahn . |
| 3,542,354 | 11/1970 | Fitzpatrick . |
| 3,770,287 | 11/1973 | Weber et al. . |
| 4,139,207 | 2/1979 | Grimes . |
| 4,300,780 | 11/1981 | Urbanic ............... 279/132 |
| 4,482,162 | 11/1984 | Anegawa ............. 279/132 |
| 4,953,877 | 9/1990 | Slachta et al. . |

Primary Examiner—Steven C. Bishop
Attorney, Agent, or Firm—Learman & McCulloch

[57] ABSTRACT

A chuck for gripping workpieces to be machined has a chuck body with a workpiece support surface for supporting a workpiece to be machined. Generally radially movable centering and gripping collet fingers are concentrically supported by the chuck body. An inflatable bladder is further mounted on the chuck body in generally concentric relationship with the fingers. Control mechanism is provided for initially radially moving the centering fingers to cause them to move radially and center said workpiece, and then supplies a fluid under pressure to inflate the bladder and move the gripping fingers generally radially to fully grip the centered workpiece.

23 Claims, 5 Drawing Sheets

FLUID-OPERATED COLLET CHUCK WITH CENTERING FINGERS

This invention relates to fluid actuated chucks for clamping and holding work pieces such as spherical bearings for machining purposes.

BACKGROUND OF THE INVENTION

A chuck has been developed for holding and gripping easily distortable workpieces. Such a chuck is disclosed in the present assignee's U.S. Pat. No. 4,953,877 to Slachta et al, granted Sep. 4, 1990, which is incorporated herein by reference, and employs a plurality of discrete flexible chucking fingers actuated by a pliable, inflatable bladder ring for radially deflecting the fingers conjointly into engagement with the peripheral wall of the workpiece. With some workpieces, where the workpiece includes a rigid hub wall which is pre-centered with respect to the machine spindle, it has been found necessary to grip a non-concentric wall of the part eccentrically, and a chuck of the type disclosed in the patent has been improved to achieve the result desired.

In contrast, the present collet chuck is provided with generally radially movable positioning fingers for centering a non-concentric workpiece, prior to fully gripping it with concentric collet fingers. The chuck is useful, inter alia, for exteriorly gripping workpieces such as spherical bearings, which are formed of a pair of mating halves which have their abutting edges brazed and may be as much as thirty to sixty thousandths out of concentricity, and securely holding them for interior wall machining.

SUMMARY OF INVENTION AND ADVANTAGES

The present chuck for holding and gripping the peripheral wall of a workpiece comprises a chuck body having a workpiece support for ultimately supporting the workpiece in a predetermined position relative to the axis of the chuck body. In a chuck which may be employed in an external wall gripping application, at least a trio of circumferentially spaced centering fingers are carried by the chuck body radially inboard of a plurality of circumferentially spaced, radially movable flexible gripping fingers, certain of which are directly radially outboard of the centering fingers and are operable to actuate them. The gripping fingers are collet fingers, some of which are interengaged with the centering fingers in a first stage actuation, and the remainder of which, in a second stage actuation, are moved by an inflatable bladder to fully grip the centered workpiece.

One of the prime objects of the invention is to provide a chuck employing a multitude of gripping collet fingers which in the first place operate centering fingers to center workpieces which are not concentric, prior to fully gripping them.

Another object of the invention is to provide a chuck in which a workpiece is gripped around its periphery at a multitude of separate gripping locations which are closely spaced around the periphery of the workpiece to securely hold the workpiece for a machining operation.

A further object of the invention is to provide a chuck of the character described wherein radially inboard collet fingers are moved to engage the workpiece by radially outboard collet fingers, certain of said inboard fingers being moved first of all to center the workpiece and the remainder being moved only thereafter to fully grip the workpiece.

Another object of the invention is to provide a highly effective and reliable chuck capable of maintaining workpieces in a centered position for high precision machining of the workpieces in a high production operation.

A further object of the invention is to provide a highly versatile chuck, capable of withstanding the heavier machining loads resulting from taking heavier cuts on more rugged workpieces, while, at the same time, finding use for holding small and fragile workpieces.

Still another object of the invention is to design a chuck which is relatively economical to build and market, considering the functions which it performs.

Other objects and advantages of the invention will become apparent with reference to the accompanying drawings and the accompanying descriptive matter.

GENERAL DESCRIPTION OF THE CHUCK

Referring now more particularly to the accompanying drawings, a letter S generally designates the spindle of a machine tool which is adapted to receive the chuck, generally designated C, of the present invention. As shown, the rotary spindle S has a forwardly flanged ring portion 8 adapted to receive a flanged portion 9 provided on the base member 12 of the chuck body, generally designated 11, of chuck C. The chuck body 11 also includes an annular sidewall or body ring member 13 which is received on the central base part 12 and may be bolted thereto as at 14. The sidewall member 13 is preferably annularly flanged as at 15 and provided with bolt openings 16, within which bolts 17 are received which extend into threaded openings 17a in the spindle S to secure the body in fixed position on the spindle S. Laterally extending set screw elements 18 may be provided at circumferential intervals to engage the side wall 19 of flange 8, as shown, for the purposes of providing concentricity adjustment and assuring that the chuck body 11 is concentrically located with respect to the axis A of the machine tool spindle S.

It will be observed that the base member 12 is centrally recessed as at 12a, to provide, with the surrounding body ring member 13, a cylinder 20 for reception of a piston element 21 which is reciprocable therein. An outboard collet, generally designated 22, has a base ring portion 22a accommodated within a recessed portion 21a of the piston 21. Pilot openings 23 are provided at circumferentially spaced intervals in the collet base 22a, in alignment with openings 24 provided in the piston 21 to receive orientation pilot pins or dowels 25, and the annular base ring 22a of the collet 22 may be bolted to the piston 21 as at 26. An O-ring 27, accommodated in a groove 28 provided in a forwardly projecting portion 12b of the base member 12, seals the piston 21 on one side, and a pair of O-rings 29 and 29a, provided respectively in piston grooves 30 and 31, seal the outboard side of the piston 21.

Figure 5:
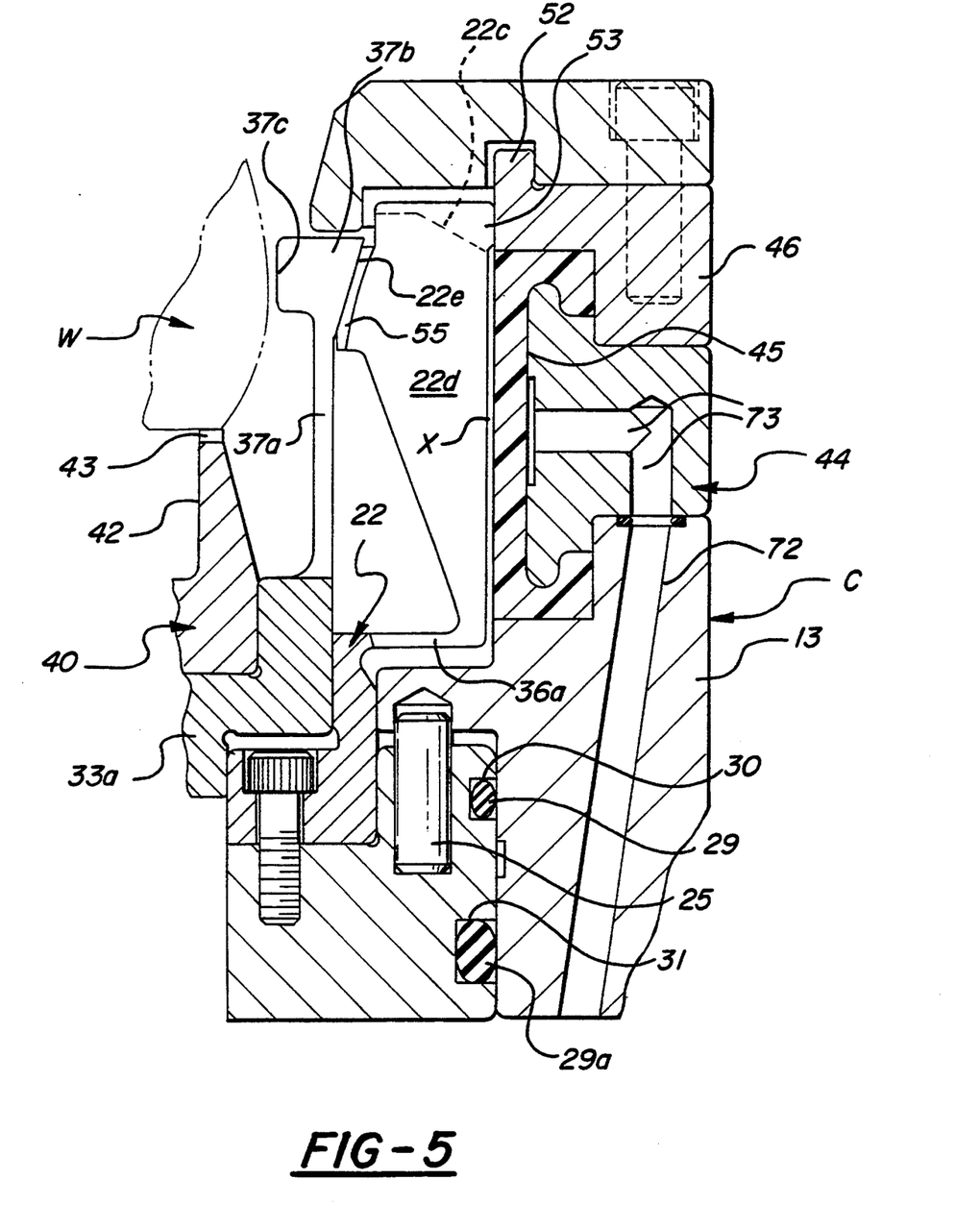
FIG. 5 is a greatly enlarged fragmentary elevational view more particularly illustrating one of the outboard collet fingers which causes an inboard centering finger to engage the workpiece.

As is usual, the collet 22 is circumferentially slit, as at 22b, at circumferentially spaced intervals to provide a series of forwardly projecting flexible fingers 22c and 22d (FIGS. 1, 5 and 6), integral with collet base ring 22a, which extend forwardly from horizontally disposed connecting reed portions 22r. In the present instance, thirty slits are provided, but more or less may be utilized. It is to be observed that the fingers 22c and 22d are provided with generally radially inwardly extending, slightly curvilinear cam surfaces 22e, and that these fingers are shouldered at their inner ends as at 22f, forwardly of the cam surfaces 22e, to provide stop surfaces which limit their radial inward movement in a manner which will be presently more fully treated.

Provided in the portion 12b of body base element 12, is a central recess 32 to receive an inner or inboard collet, generally designated 33, having a base portion 33a which is received within the recessed portion 32. Again, pilot or dowel pins 34 are provided in appropriately aligned openings 35 and 35a, provided in the collet base 33a of collet 33 and chuck base 12 respectively. Fastener bolt 34a fixes collet base portion 33a to the chuck base 12.

It will be observed that the inner collet 33 is shouldered as at 33b so as to be telescopically received within the base ring 22a of collet 22 and, further, is telescopically received at 33c within the outboard collet 22. Cutouts 36, culminating in slits 36a, configure the collet 33 with a plurality of integral flexible fingers, generally designated 37, having reed sections 37a and front ends with workpiece engaging surfaces 37b. Cam follower surfaces 38, are provided on the fingers 37 for cooperation with the cam surfaces 22e on the outboard collet fingers 22c and 22d.

To hold the workpiece, which is generally designated W, so that its bore 39, for example, may be machined, an annular workpiece support member, generally designated 40, has its base 40a received within a recessed opening 41 provided in the front end of inboard collet base 33a, as shown. A trio of workpiece support columns 42 extend forwardly from the workpiece support 40 and include workpiece engaging caps 43.

Mounted atop the body member 13, radially opposite the outboard fingers 22c and 22d is an annular bladder ring support element, generally designated 44, for mounting a resilient inflatable bladder ring 45 in the usual manner. The annular ring 44 includes shoulder beads 44a for securely mounting and sealing the complementally configured, annular return lips 45a. The mount ring 44, on its radially inner surface, includes a recessed annular chamber 44b which facilitates the uniform inflation and expansion of the bladder 45, and, it will be noted, that the inner radial surface of bladder 45 lies generally adjacent the fingers 22c and 22d. Above the mount ring 44, an annular retention ring 46 is received within a recess 44c in mount ring 44. Finally, a cover ring, generally designated 48, is provided, and it will be seen that elongate bolts 49 may be utilized to secure the mount rings 44, 45 and cover ring 48 in position on the chuck body wall element 13. The cover 48 may also be bolted to the ring 45 as at 50.

It is to be observed that the cover member 48 has an overhanging lip or flange 48a which provides a radial stop surface 48b for limiting inward pivoting movement of the fingers 22c and 22d. The underside of the cover member 48 is also annularly grooved, as at 51, to receive an annular cover locating shoulder 52 which projects forwardly from the ring 45.

Figure 6:
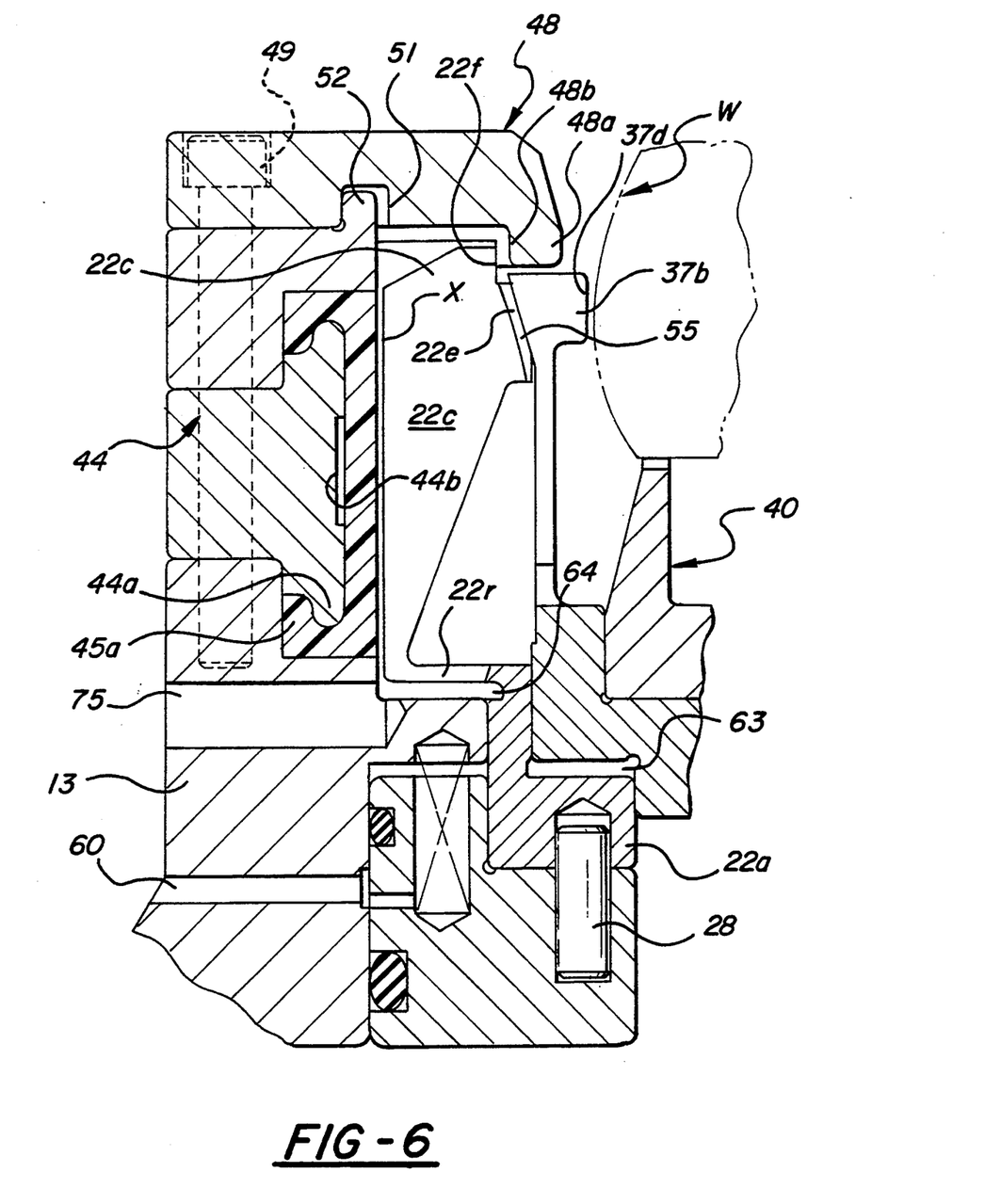
FIG. 6 is a similar enlarged fragmentary elevational view of the chuck in the ready position, illustrating one of the outboard collet fingers which engages an inboard collet finger and deflects it radially to, conjunctively with companion fingers, effect full gripping of the centered workpiece.

The fingers 22c (see FIG. 6) extend upwardly from the reed sections 22r at a spaced radial distance "X" from the member 13, bladder ring 45, and retention ring 46 (FIG. 6). The fingers 22d are similarly radially spaced, except at their front ends, where they are shouldered, as at 53, (FIG. 5) to ride along retention ring 46 when the collet 22 is moved forwardly. It is further to be noted that the workpiece contacting surfaces 37b of those fingers 37a immediately radially inboard of collet fingers 22d project a clearance distance "Y" beyond the workpiece engaging surfaces 37c of the other fingers 37a so that they have less distance to move to engage the workpiece.

Figure 1:
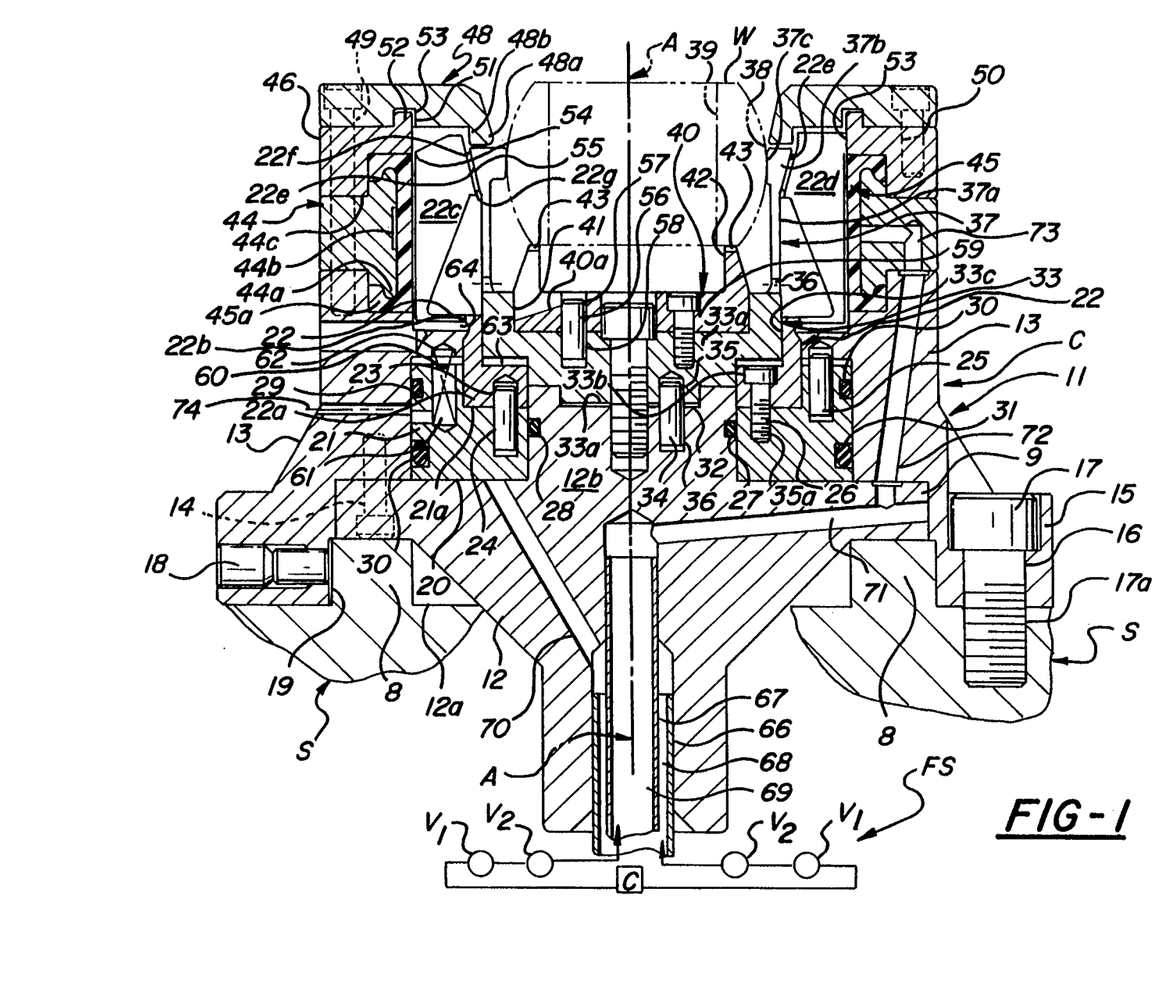
FIG. 1 is a partly sectional, schematic side elevational view taken on the line 1—1 of FIG. 2.
Figure 2:
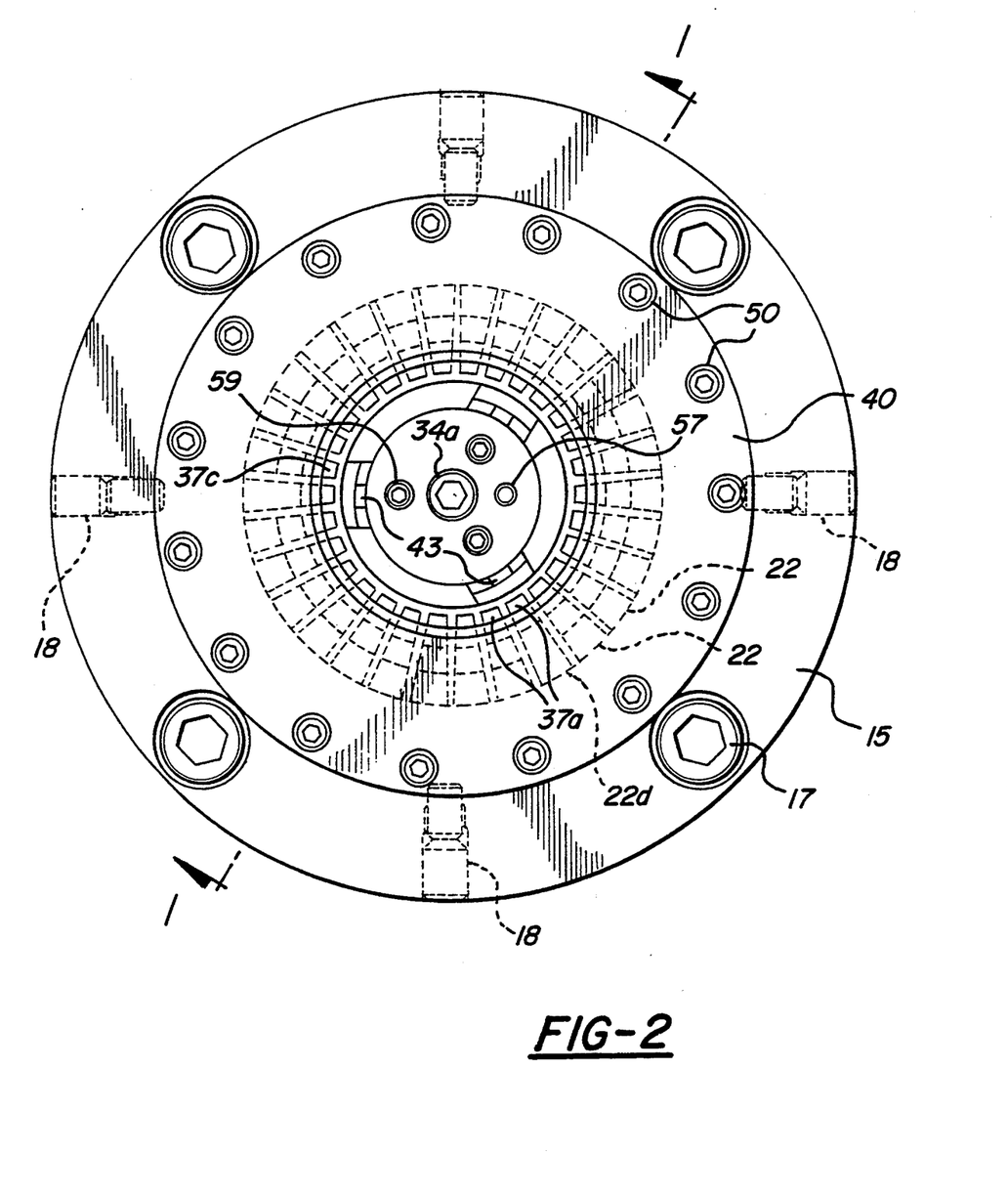
FIG. 2 is an enlarged top plan view of the chuck in the ready position.
Figure 3:
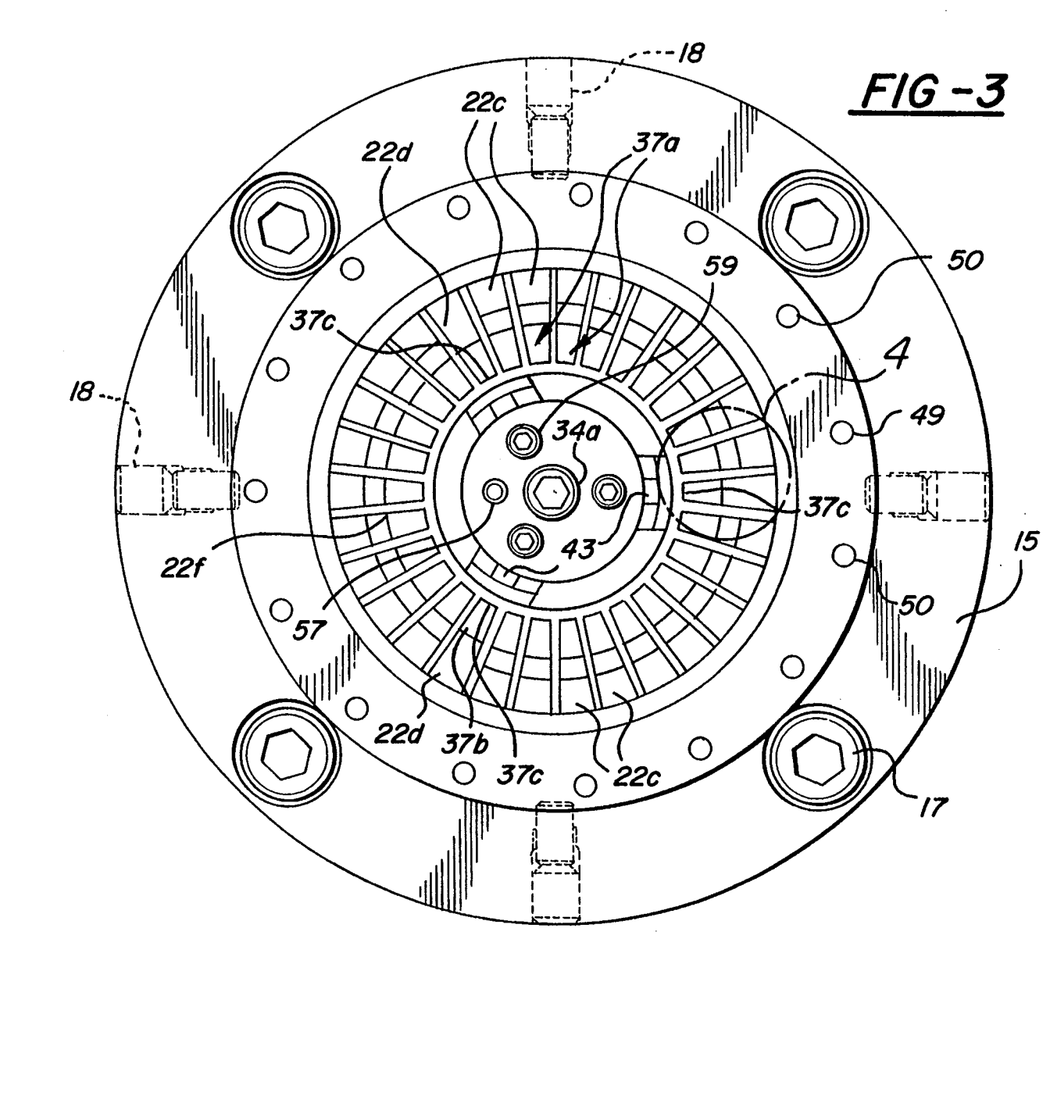
FIG. 3 is a top plan view with the cover plate removed to expose the centering and gripping fingers.
Figure 4:
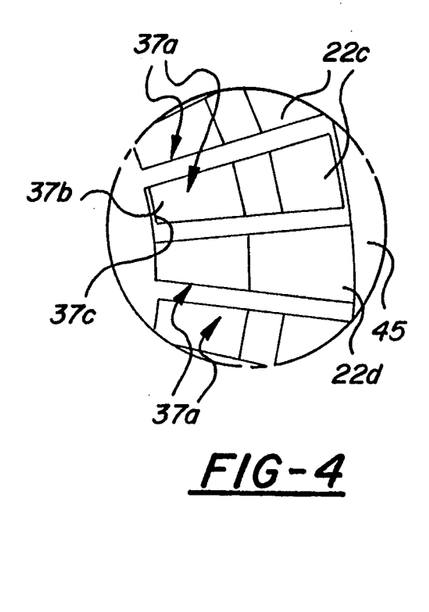
FIG. 4 is a considerably enlarged top plan view of the encircled portion in FIG. 3.

In the non-workpiece-gripping position of the chuck C, a clearance 54 is provided between the shouldered portions 22f and 48b respectively as shown in FIG. 1. While not shown in the drawings, hardened inserts or faces, similar to the pads 55 provided on fingers 22c and 22d, may be provided on the work engaging surfaces 37c of fingers 37b. The number of collet fingers 37a is the same as the combined number of collet fingers 22c and 22d, and the fingers of the inboard collet 33 are all radially aligned with the fingers of the outboard collet 22. There are a trio of outboard collet fingers 22d spaced at 120° intervals on collet base ring 22a. The position of the workpiece support 40 is maintained by locator pins 56 received within openings 57, provided in the workpiece support 40, and aligned openings 58 in the collet body 33a, and the workpiece support 40 may be bolted in position by circumferentially spaced bolt members 59.

Provided to normally maintain the piston 21 in retracted rear position, are a series of circumferentially spaced, coil springs 60 which are received in spring wells 61, provided in the piston 21, and 62 provided in the body ring member 13. It will be noted that an operating clearance 63 is provided between the collet base part 33a and collet base ring 22a, and a similar operating clearance 64 is provided between the reed sections 22d and body ring 13 to provide for relative movement of the parts upon operation of the piston 21.

To provide fluid under pressure to operate the chuck, e.g. either air under pressure or hydraulic fluid under pressure, a control mechanism which includes a two stage fluid delivery system, generally designated FS, is provided, as shown in FIG. 1. This system includes an outer tube 66 and an inner tube 67 providing an outer annular passageway 68 and an inner passageway 69. The outer passageway 68 leads to a passage 70 which communicates with the lower end of chamber 12a, and the passage 69 communicates with a passageway system comprising a passage 71 in the base member 12, leading to a passage 72 in body ring 13 and passageway 73 in bladder mount ring 44, which leads to the annular passage 44b. As FIG. 1 indicates, a source of pressurized actuating fluid, such as a compressor C or a hydraulic pump, may be used to separately supply fluid to the passages 68 and 69 consecutively to operate the chuck in a manner which will be described. The system, which can be automatically operated via a suitable programmable controller, or could be manually operated, may include an on-off valve $V_1$ and a bleed valve $V_2$ for each of the conduits 66 and 67 to supply fluid through suitable passages in the machine tool spindle to the passages 68 and 69 selectively. Bleed passages 74 may be provided in the ring wall 13 and in the piston 21 to relieve any air pressure which builds above seals 30 and 27 through piston forward movement. In addition, bleed passages 75 may be provided in the wall member 13 to egress cooling fluid or chips and any other foreign matter.

THE OPERATION

Assuming, in the first instance, that the chuck C is in the nongripping position shown in FIG. 1, and that a workpiece W has been loaded to the work support platform 40 in a manner such that the fingers 37b are slightly out of contact therewith, and, further, that workpiece W is a slightly out of round spherical bearing which is not concentric with axis A, the first step in the chucking process will be to supply fluid under pressure through the passageway 68 to passageway 70 and the lower end of cylinder 12a. This will move piston 21 and collet 22 forwardly to move the fingers 22c and 22d forwardly with respect to collet fingers 37a. Collet fingers 22d are prevented by shoulders 53 from swinging outwardly when load is encountered at their cam surfaces 22e and, therefore, deflect the fingers 37a in radial alignment with them into workpiece centering engagement with the workpiece wall. The curvilinearity of surfaces 22e compensates for the fact the fingers 22d and 37a deflect arcuately. The fingers 22c, which do not have the shoulders 53, will not move the fingers 37a in radial alignment with them into engagement with the workpiece W at this time, due to clearances "X" and "Y". This first stage of actuation, via the cam follower surfaces 38 on the trio of fingers 37b in radial alignment with the cam surfaces 22e on fingers 22d grips the wall of the work face via the flexibility provided by the collet reed sections 37a. Radial inward movement of the prepositioning or centering fingers 22d will be limited by the stop surface 48b.

In this way, the position of the workpiece W is adjusted to center it with respect to axis A, and, it is only after that centering occurs, that air under pressure is fed through the passages 69, 71, 72 and 73 to passage 44b to uniformly radially inflate the resilient bladder ring 45 to cause it to bear radially against the fingers 22c and 22d. The fingers 22c, are forced radially inwardly by the bladder 45 to grip the workpiece W around its periphery via the medium of forcing the radially aligned fingers 37 into engagement with the workpiece wall to hold it in a position for, for example, machining of the bore surface 39. In the present instance, the use of certain of the fingers 22d to, in the first place, engage certain of the collet fingers 37 with the workpiece, avoids the need for providing separate actuating elements, and, when bladder 45 expands, the remaining fingers 22c can be readily swung about the reed sections 22d into a workpiece gripping position also. The added pressure on the prepositioning collet fingers 22d (which cannot move further radially because of stop lip 48a or part contact, whichever restricts them first) only more securely locks them and does not interfere with the grip effected by the other fingers 22c.

When the machining operation has been completed and it is desired to release the workpiece W, air is bled from the manifold passage 44b initially out through the passageway system comprising passages 73, 72, 71 and 69 first of all. This permits bladder 45 and the fingers 22c to resiliently return to the initial position shown in FIG. 1, in company with the fingers 37a in alignment with fingers 22c. Then the air is bled from the piston chamber 20 through passages 70 and 68 so that the springs 62 can axially restore the collet 22 to the original position in which it is shown in FIG. 1. This retracting movement frees the collet fingers 22d and the collet fingers 37a in radial alignment therewith to resiliently return to original position. The chuck will operate stationarily as well as when rotated with a spindle.

It is to be understood that the embodiments described are exemplary of various forms of the invention only and that the invention is defined in the appended claims which contemplate various modifications within the spirit and scope of the invention.

We claim:

1. In a chuck for gripping workpieces to be machined, the combination of:
    (a) a chuck body, having a base end and a front end, adapted to be mounted on a machine tool spindle having a rotative axis;
    (b) a workpiece support surface for supporting a workpiece to be machined provided for said chuck body at the front end thereof;
    (c) generally radially movable prepositioning fingers supported on said chuck body in concentric relationship with said axis;
    (d) a collet supported on said chuck body in concentric relationship with said axis and having generally axially extending, generally radially swingable resilient gripping fingers extending from a collet base;
    (e) an inflatable bladder mounted on said chuck body in generally concentric relationship with said collet; and
    (f) control mechanism interacting for radially moving said pre-positioning fingers to cause them to move radially and center said workpiece and then supplying a fluid under pressure to inflate said bladder and move said gripping fingers generally radially to grip the workpiece.

2. The chuck of claim 1 wherein said chuck body is generally cup shaped with an open front end, and said workpiece support surface is disposed within said open front end; said prepositioning fingers surround said workpiece support; said collet surrounds said prepositioning fingers, and said bladder surrounds said collet.

3. The chuck of claim 1 wherein cam and cam follower surfaces are interactable between said prepositioning fingers and certain of said gripping fingers to move said prepositioning fingers radially into engagement with the workpiece; and said control mechanism includes an actuating element for selectively moving said collet generally axially to cause said certain of said gripping fingers to act via said cam and cam follower surfaces to center the workpiece.

4. The chuck of claim 3 wherein said actuating element comprises a fluid pressure operated piston connected with said collet, and spring elements to normally maintain said piston and collet in inoperative retracted position.

5. The chuck of claim 4 wherein said control mechanism includes a two passageway system which supplies fluid under pressure to said piston to activate said prepositioning fingers to move into radial engagement with the workpiece, prior to supplying fluid under pressure to inflate said bladder.

6. In a method of operating a workpiece gripping chuck having a chuck body with a front end and a rear base end adapted to mount on a machine tool; a workpiece support surface for the front end of the chuck body for supporting a workpiece to be machined; a first plurality of generally radially movable prepositioning fingers supported in circumferentially spaced relation concentrically with said axis by said chuck body; a second plurality of both generally axially and radially movable flexible fingers supported concentrically with said axis on said chuck body in circumferentially spaced position, with certain of said second plurality of fingers radially adjacent said prepositioning fingers; an inflatable bladder on said chuck body in generally concentric relationship with said axis and adjacent to said second plurality of fingers; interengaging actuating surfaces on said prepositioning fingers and said certain of said fingers whereby movement of said certain of said fingers moves said prepositioning fingers generally radially; and control mechanism for first causing axial movement of said certain of said fingers to move said prepositioning fingers generally radially and then supplying fluid under pressure to inflate said bladder, the steps of:
   (a) loading a workpiece, having a radial wall to be gripped, to said workpiece support surface;
   (b) moving said certain of said fingers generally axially to actuate said prepositioning fingers and cause them to move radially and engage said radial wall to center the workpiece; and
   (c) inflating said bladder to cause said second plurality of fingers, other than said certain fingers to grip the centered radial wall of the workpiece.

7. In a workpiece gripping chuck;
   (a) a chuck body having a front end and a rear base end adapted to be mounted on a machine tool;
   (b) a workpiece support surface for the front end of said chuck body;
   (c) a first plurality of circumferentially spaced, generally radially movable, workpiece centering fingers supported concentrically with said axis on said chuck body;
   (d) a second plurality of circumferentially spaced, generally radially deflectable axially extending fingers supported concentrically with said axis on said chuck body, with certain of said fingers radially adjacent said centering fingers;
   (e) engageable interacting surfaces on said centering fingers and said certain of said fingers whereby movement of said certain of said fingers moves said centering fingers generally radially;
   (f) an inflatable bladder on said chuck body in generally concentric relationship with said axis and second plurality of fingers and radially adjacent thereto; and
   (g) control mechanism for causing movement of said certain of said fingers to radially move said centering fingers to grip and center the workpiece, and inflating said bladder to activate said second plurality of fingers to radially deflect and grip said workpiece.

8. The chuck of claim 7 wherein said interengaging surfaces comprise axially tapering cam surfaces, and said certain of said fingers are moved axially to effect general radial movement of said centering fingers.

9. The chuck of claim 8 wherein said control mechanism includes a cylinder within said chuck body, and a piston therein connected to said second plurality of fingers.

10. The chuck of claim 9 wherein said control mechanism includes a two passageway system, for admitting fluid under pressure, communicating separately with said cylinder and with said bladder.

11. The chuck of claim 10 wherein the fluid under pressure is supplied to said cylinder before it is supplied to inflate said bladder and is maintained while said bladder is inflated.

12. The chuck of claim 7 wherein said chuck body is recessed at its front end to provide a workpiece accommodating recess and said workpiece support surface is situated within the recessed portion; said first plurality of fingers are fingers mounted to be deflectable radially into and out of said recess; and said second plurality of fingers are fingers situated radially outboard of said centering fingers; certain of said second plurality of fingers being in radial alignment with said centering fingers and others of said second plurality of fingers being situated circumferentially between said certain fingers.

13. The chuck of claim 12 wherein said centering fingers are provided on a common collet base ring to extend forwardly adjacent said recess; and said second plurality of fingers is provided on a second collet common base ring to extend forwardly outboard of said centering fingers.

14. The chuck of claim 13 wherein the common base ring for said second plurality of fingers comprises an annular ring within which the common base ring for said centering fingers is telescopically received.

15. The chuck of claim 14 wherein springs under compression normally urge said base ring for said centering fingers rearwardly to normally maintain said certain of said fingers out of operative engagement with said centering fingers.

16. The chuck of claim 13 wherein said first plurality of fingers includes workpiece engaging fingers situated circumferentially between said centering fingers, and said other of said second plurality of fingers achieve gripping by being moved radially inwardly by said bladder to grip the workpiece via exerting pressure on said workpiece engaging fingers between said centering fingers.

17. The chuck of claim 16 wherein the number of said first and second plurality of fingers is the same and the fingers are radially aligned.

18. The chuck of claim 16 wherein said other of said second plurality of fingers is radially spaced from the bladder and chuck body, and said certain of said second plurality of fingers is configured to have surfaces bearing on said chuck body to prevent them from moving radially outwardly when said interacting surfaces are engaged.

19. In a workpiece gripping chuck;
   (a) an axially extending chuck body having a front end and a rear base end adapted to be mounted on a machine tool;
   (b) a workpiece support surface for the front end of said chuck body;
   (c) a collet mechanism having generally radially movable workpiece centering fingers and generally radially deflectable gripping fingers supported concentrically with the chuck body;
(d) an inflatable bladder on said chuck body in generally concentric relationship with said fingers and radially adjacent thereto; and
(e) control mechanism for first causing radial movement of said centering fingers to radially center the workpiece, and for inflating said bladder to activate said gripping fingers to radially deflect to grip said centered workpiece.

20. The chuck of claim 19 wherein said collet mechanism includes an inboard collet radially adjacent the workpiece support and workpiece and an outboard collet adjacent the bladder, and wherein the inboard collet has centering fingers in radial alignment with centering fingers on the outboard collet; the inboard collet further having gripping fingers in radial alignment with gripping fingers on the outboard collet.

21. The chuck of claim 20 wherein interengaging surfaces comprising axially tapering cam surfaces and cam follower surfaces are provided on said centering fingers of the inboard and outboard collets, and said control mechanism includes an actuator for moving said outboard collet axially relative to said inboard collet to effect general radial movement of said centering fingers on the inboard collet into workpiece engaging position.

22. The chuck of claim 21 wherein springs under compression normally urge said outboard collet rearwardly to normally maintain said centering fingers on the outboard collet out of operative engagement with said centering fingers on the inboard collet.

23. The chuck of claim 21 wherein the gripping fingers on said outboard collet are configured to move axially, without radially deflecting, to operate the gripping fingers on the inboard collet to grip the workpiece when the outboard collet is moved axially forwardly from inoperative position.

* * * * *